United States Patent [19]

Blaum et al.

[11] Patent Number: 5,333,143
[45] Date of Patent: Jul. 26, 1994

[54] METHOD AND MEANS FOR B-ADJACENT CODING AND REBUILDING DATA FROM UP TO TWO UNAVAILABLE DASDS IN A DASD ARRAY

[75] Inventors: Miguel M. Blaum; Norman K. Ouchi, both of San Jose, Calif.

[73] Assignee: International Business Machines Corporation, Armonk, N.Y.

[21] Appl. No.: 751,950

[22] Filed: Aug. 29, 1991

[51] Int. Cl.$^5$ .............................................. G06F 7/22
[52] U.S. Cl. ................................... 371/40.4; 371/2.1; 371/10.2
[58] Field of Search ............ 371/10.2, 2.1, 37.1, 371/37.4, 37.6, 38.1, 40.4; 395/425

[56] References Cited

U.S. PATENT DOCUMENTS

| | | | |
|---|---|---|---|
| 3,745,538 | 7/1978 | Patel | 340/146.1 |
| 4,092,732 | 5/1978 | Ouchi | 364/900 |
| 4,775,978 | 10/1988 | Hartness | 371/38 |
| 4,914,656 | 4/1990 | Dunphy, Jr. et al. | 371/10.2 |

OTHER PUBLICATIONS

"A Case for Redundant Arrays of Inexpensive Disks (RAID)," D. A. Patterson, et al., UCB/CSD 87/391, Dec. 1987, Computer Science Division, U.C. of Berkeley, pp. 109–116.

"Computer Design", Langdon, Computeach Press, San Jose, Calif., LC 81-71785, pp. 463–505, and Sequential Logic, pp. 506–557.

Watkinson, "Coding for Digital Recording", Focal Press of Butterworth Scientific, 1990, pp. 119–130.

Primary Examiner—Vincent P. Canney
Attorney, Agent, or Firm—R. Bruce Brodie

[57] ABSTRACT

B-Adjacent coding is used to correct up to two DASDs in error in an array of N data DASDs and two redundant DASDs. When two of the data DASDs fail, their data can be recreated as a function of a pair of syndromes constituting up to two Boolean equations in two unknowns. Prestoring of the matrices of the powers of the polynomial terms of the code primitive together with pipeline processing operate to expedite data recovery and balance the write operations load on the DASDs across the array. Recovery from the failure of a data and a redundant DASD involves resolving one linear Boolean equation with one unknown.

11 Claims, 2 Drawing Sheets

METHOD AND MEANS FOR B-ADJACENT CODING AND REBUILDING DATA FROM UP TO TWO UNAVAILABLE DASDS IN A DASD ARRAY

FIELD OF THE INVENTION

This invention relates to a method and means for the polynomial coded correction of portions of a data string stored on up to two unavailable DASDs in an array of N+2 DASDs.

DESCRIPTION OF RELATED ART

Striping and Parity Encoding Records Over DASD Arrays and Recovery from Single DASD Failure By Modulo 2 Addition Ouchi, U.S. Pat. No. 4,092,732, "A System for the Recovering Data Stored in a Failed Memory Unit", issued May 30, 1978, was the first to disclose and claim the coding and writing of a segmented, block interleaved, parity domain onto counterpart ones of an array of DASDs where the data and storage bounds were coextensive. This feature was later redescribed in Hartness, U.S. Pat. No. 4,775,978, "Data Error Correction System", issued Oct. 4, 1988.

In such external storage systems, correction of blocks requires identification of failed DASDs. This can be achieved by Hamming codes. However, such codes are usually used on a bit rather than block interleaved DASD array and the number of DASDs dedicated to redundancy is a significant fraction of the total as reported by Patterson et al, "A Case For Redundant Arrays Of Inexpensive Disks (RAID)", Report No. UCB/CSD 87/391, December 1987, Computer Science Division, U. of California, Berkeley.

In contrast, block interleave and simple parity coding as set forth in Ouchi permit a near infinite parity domain or striping width and only one redundant DASD need be involved. However, the identification of any failed DASD must be obtained independently such as by threshold ECC retry or equivalent. Reference should also be made to Dunphy et al, U.S. Pat. No. 4,914,656, "Disk Drive Memory", issued Apr. 3, 1990.

B-Adjacent Codes

Watkinson, "Coding for Digital Recording", published by Focal Press of Butterworth Scientific and copyrighted 1990 by the author, pages 119-130, describes B-adjacent codes for correction of burst errors in digital audio recording resulting in two Boolean equations (syndromes S(0),S(1)) with two unknowns. Two redundancy bytes R(0), R(1) are also described. R(0) covers an XOR over the data string while R(1) results from a finite field polynomial operation over said string.

The syndromes are the modulo two sums defined by B-adjacent code parity check matrix H including R(0) and R(1) and determined when reading one or more blocks. Advantageously, up to two blocks in error spanned by either syndrome will provide a nonzero indication. The blocks are corrected by processing the syndromes. That is, the corrected blocks are a readily computable function of the detected syndromes.

B-Adjacent coding was first disclosed and claimed by Arvind Patel, U.S. Pat. No. 3,745,528, "Error Correction for Two Tracks in a Multitrack System", issued Jul. 10, 1973.

Data Availability, Redundancy, and Hot Sparing

The fastest recovery from DASD failure is to electronically switch to a completely duplicated or mirrored data set stored on a second storage domain. This obviously doubles storage costs. DASD arrays, as described by Ouchi and Dunphy, assume that the probability of a single DASD failure in an array is high while that of concurrent DASD failure is low. Further, in order to return a system having had a single failure back to fault tolerant state, hot sparing is used.

Hot sparing, as defined by Dunphy, involves reserving one or more DASDs, substituting a spare to a domain after a DASD within that domain has failed, and rebuilding the otherwise unavailable blocks onto the spare. As long as the DASD failures are not nested within the interval defined by DASD failure and the completion of rebuilding data onto the spare, then the mean time between data unavailability can be very long indeed. Further, single DASD correction +sparing per Ouchi and Dunphy keep the number of idle or redundant DASDs to a minimum.

Array Data Rebuild for Up to Two DASD Failures

Blaum et. al. U.S. Pat. No. 5,271,012, filed Feb. 11, 1991, issued Dec. 14, 1993, "Method And Means For Encoding And Rebuilding Data Contents Of Up To Two Unavailable DASDs In An Array Of DASDs", teaches a method for coding and rebuilding (M-1)*M bit data array onto an M synchronous DASD array when up to two DASDs fail, M being a prime. Pairs of simple parities are recursively coded in respective diagonal major and intersecting row major order data array directions covering a topological torus. Rebuilding data upon unavailability of no more than two DASDs requires repeating the coding step where the diagonals are oppositely sloped and writing the rebuilt array back.

Data Error and Erasure

"Data error" means any change in stored value as a consequence of a random noise or burst process. In systems storing binary values such as 1 1 1 0 0 1 0 0, remanent magnetization states change such that some 1's become 0's and some 0's become 1's. This might appear as 1 1 0 0 0 1 0 1. Here, the values in the 3rd and 8th positions from the left are random errors. A run of errors due to a burst source might appear as 1 1 1 1 1 1 1 0. Note, while the first seven consecutive positions were overwritten, only positions 3 through 7 are actually in error.

"Erasure" is the removal of any data value in a storage location. For example, the data string 1 x x x x 1 0 0 omits any binary values in positions 2 through 5.

SUMMARY OF THE INVENTION

It is an object of this invention to devise a method and means for enhancing the availability of a DASD array in the presence of data errors, erasures, and DASD failures.

It is a related object to devise a method and means for encoding and rebuilding of the data contents including erasures of up to a two unavailable DASDs in an N+2 DASD array using polynomial generated codes other than simple parity codes.

It is yet another related object that said method and means rapidly process blocks in error in order to dynamically and concurrently correct blocks exhibiting soft errors from any sub-group of up to two DASDs in an N+2 DASD array.

These and other objects are satisfied by a method and means for correcting portions of a data string b stored on up to two unavailable DASDs in a DASD array using B-adjacent coding. The method steps include (a) independent identification of the failed DASDs and (b) formation and resolution of a pair of syndromes obtained from the blocks of the same string on the remaining DASDs. The syndrome pair (S(0),S(1)) consist of two independent Boolean equations in two unknowns.

Each data string b is segmented into N data blocks +2 redundant blocks and then written across N+2 counterpart DASDs. The redundant blocks (R(0),R(1)) are computed over the string. The first redundant block, R(0), is the XOR of N data blocks while the second redundant block, R(1), is the modulo 2 sum of the products of a primitive element in a finite field (Galois field) raised to a declining power ($a^{(N-i)}$) and the modulo 2 data value (b(i)), of a counterpart one of N other blocks. R(0) and R(1) appending each segmented string are expressed as:

$$R(0) = b(0) + b(1) + \ldots + b(N-1) \bmod 2$$

$$R(1) = a^{(N-1)} * b(0) + a^{(N-2)} * b(1) + \ldots + a^{(0)} * b(N-1) \bmod 2$$

If b(i) and b(j) are unavailable blocks, then the first step in their recovery is evaluating the syndromes S(0) and S(1). To this end, b(i) and b(j) are set equal to 0 as a default value for syndrome computations. Also, the same circuits are used for syndrome determinations as for encoding. Explicitly, the syndromes are given by:

$$S(0) = b(0) + b(1) + \ldots + b(N-1) + R(0) \bmod 2$$

$$S(1) = a^{(N-1)} * b(0) + a^{(N-2)} b + a^{(N-2)} * b(1) + \ldots + a^{(0)} * b(N-1) + R(1) \bmod 2$$

The unavailable blocks b(i) and b(j) as a function of the syndromes S(0) and S(1) are:

$$b(i) = [S(1) * a^{(j+1)} + S(0)] / [a^{(j-i)} + 1] \bmod 2$$

$$b(j) = S(0) + b(i) \bmod 2$$

If block b(i) is unavailable and also the redundant block R(0), then b(i) as a function of the syndrome S(1) is given by:

$$b(i) = a^{(i+1)} * S(1)$$

Finally, if block b(i) is unavailable and also the redundant block R(1), then b(i) as a function of the syndrome S(0) is given by:

$$b(i) = S(0)$$

It was unexpectedly discovered that pipeline processing of error correction in the method and means of this invention facilitates the detection and correction of soft as well as hard errors. That is, rapid processing permits dynamically correcting soft errors of blocks and does not limit such correction to the static rebuilding of blocks from up to any two unavailable DASDs. In this regard, the speed derives from the use of prestored information and recursive computing structures. These permit overlap processing of the terms of the Boolean expressions defining the blocks in error.

More particularly, in the pipeline processing embodiment, a path is provided for correcting blocks b(i) and b(j) in error from each of the syndromes using pre-stored Boolean valued matrix representations for each of the polynomial terms of the finite arithmetic field primitive expressed therein. The pipeline paths include a first matrix multiplication, a first addition, a second multiplication, and a second addition to solve the two linear Boolean equations b(i) and b(j) in two unknowns.

DESCRIPTION OF THE PREFERRED EMBODIMENTS

First, there is briefly described the data flow in a RAID 3 type DASD array in which each data string is segmented or striped, redundancy encoding taken across the string, and the blocks written to counterpart DASDs in an addressed parity domain. An ECC block is appended by the DASD prior to writing to the actual track. This is followed by a discussion of DASD failure and "hot sparing".

Since correction of the data contents of up to two unavailable DASDs statically and of up to two blocks in error in each data string dynamically involves algebraic code manipulations, there is set forth a discussion of the formation of powers of primitives in a subfield extension of the binary finite field by way of an exemplary generating polynomial. This is followed by a partial derivation of the redundancy expressions used in the error correction aspects of B-Adjacent coding as applied across segmented blocks of a data string, which string is either written or read from a DASD array.

Next, the method and means of the inventive pipeline processing of the strings and their redundancy blocks using pre-stored array values for the power coefficients involved in the redundancy and error correction is described. This is followed by a concrete instance.

Overview of DASD Array Read and Write Operations

Figure 1:
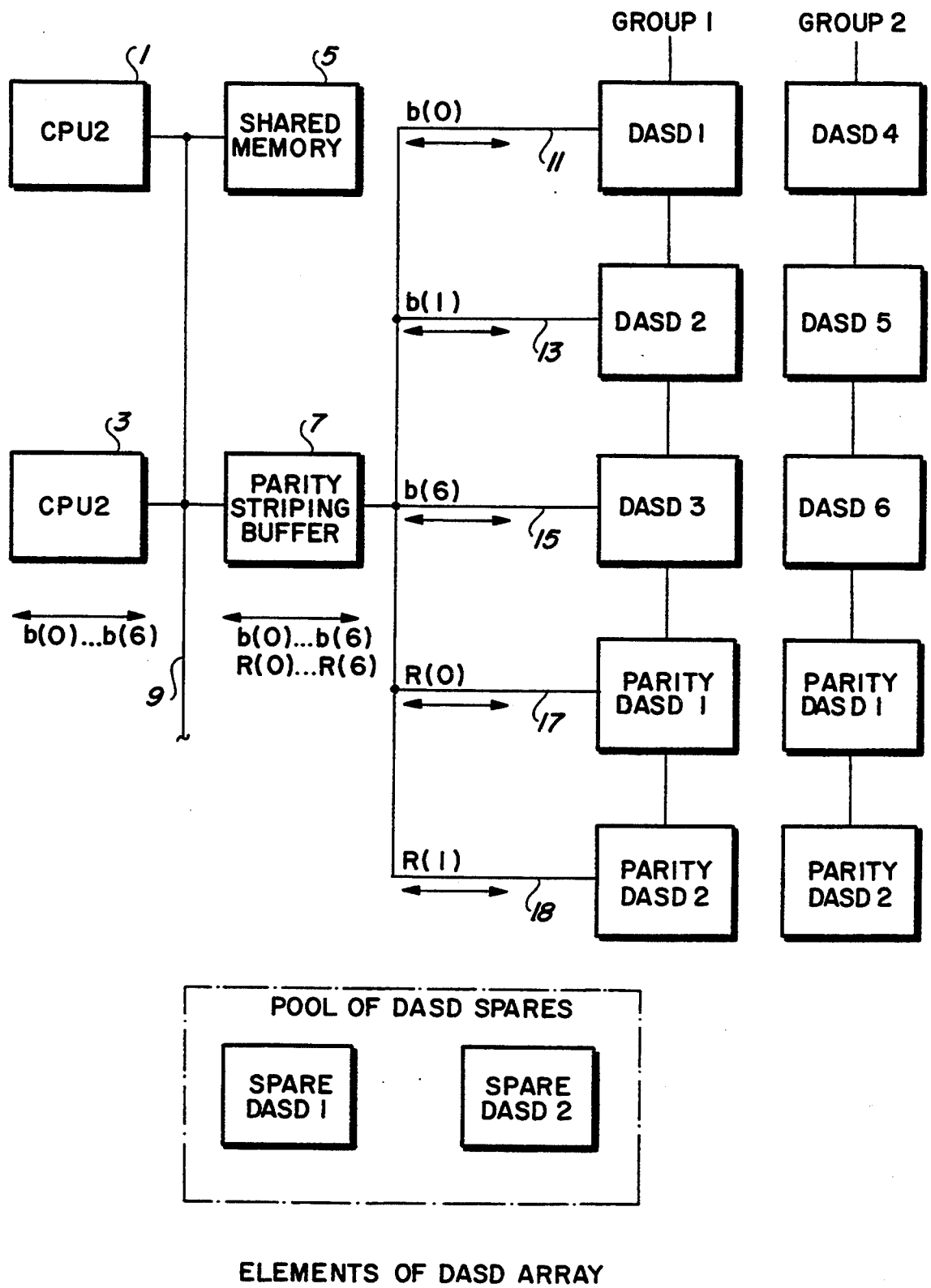
FIG. 1 shows a synchronous DASD array illustrating striping, parity encoding, sparing, and data redo on spares.

Referring now to FIG. 1, there is shown an array comprising a first and second DASD parity group coupling an intelligent parity generating and striping buffer (PSB) 7 over parallel paths 11, 13, 15, and 17. A processor array formed from CPU1 and CPU2 is coupled to data and control bus 9.

Processor 1 or 3 originated read and write commands establish a table directed access path to a parity group of DASDs by way of a standard accessing protocol and data movement over bus 9 shared memory 5 to PSB 7. The logical processing of a logical files is executed at PSB 7. In this regard, logical processing includes both striping (serial/parallel conversion of data) and parity generation and checking. The paths to and from the DASDs are table directed. In principle, an address specified in a read or write argument is translated by the PSB 7 via an array storage address table into the actual physical path between PSB 7 and the location on the DASDs of the requisite parity group.

To execute a write command, PSB 7 must first buffer the new data from the processor, read and buffer a data string of N bytes from the DASD parity group within which the striped or interleaved elements of the block are to be written, recursively recompute the redundant bytes associated with the B-adjacent code the old data, old redundant bytes, and new data into account, and then rewrite the modified data string back onto the DASD parity group.

For a read operation, PSB 7 responsive to a read command from a processor performs inverse operation sequence to that of writing. That is, the data string within which the data to be read must be extracted is buffered in PSB 7, appropriate redundant bytes tested, and the addressed data transferred across bus 9 to shared memory 5.

DASD Failure and Hot Sparing

In the event that a DASD failure occurs while read accessing data, PSB 7 can select one from a number of alternatives. These include regenerating corrupted data on-the-fly by either (1) retry of the read command or (2) reconstruction of the data from remaining DASDs and replacement according to the method of the invention.

With respect to the processor 1 or 3 originating the read command, one strategy is to notify it of the failure occurrence only AFTER completion of the read data movement. This would permit the processor to control substitution of a spare DASD from a pool or from a DASD reserved exclusively to each parity group in the manner of Park et al. Responsive to processor commands such as DISABLE and RECONSTRUCT, PSB 7 can cause the failed DASD to be replaced with a designated spare DASD by table substituting the directory path to the spare for the table directory path of the failed DASD. Next, the data on the failed DASD can be rebuilt on the designated spare DASD.

In one embodiment, PSB 7 stores a bit map of DASD availability and address map of the DASDs. In turn, the availability and address maps are referenced during the processing of each access command. Alterations to the maps may be originated by the processor using the DISABLE and RECONSTRUCT commands. In such an implementation, a permanent address is assigned to the SPARE DASD. Significantly, after failure notification, the processor 1 or 3 can address map of the DASDs. In turn, the availability and address maps are referenced during the processing of each access command. Alterations to the maps are originated by the processor using the DISABLE and RECONSTRUCT commands. The present implementation assigns a permanent address to the SPARE DASD. Significantly, after failure notification, the processor can (1) elect to do nothing; OR
(2) generate commands causing the addresses of the spare DASDs to be substituted for the addresses for up to two of the failed DASDs; AND
(3) reconstruct the contents of up to two failed DASD on the assigned spares by modulo 2 addition of parities plus remaining data DASDs according to the reconstruction method set out below.

Note, the dynamic substitution of a spare formatted DASDs for other DASDs on-line is termed "hot sparing".

Construction of A Finite Polynomial Field

It is well known that error correcting codes for q-nary symbols ($q=2^B$) can be used for correction of clusters of B-adjacent binary symbols. Loosely, the B-adjacent code is generated by using elements of a sub-field of a higher order extension field of the binary base finite field over each data string for one of the redundancy blocks and an exclusive OR (modulo 2 addition) over the string for the other.

Illustratively, assume that each data string to be written and read to and from a DASD array can be partitioned into N segments of three bit bytes/segment. A Galois or finite field of $2^3$ or 8 terms $\{GF(2^3)=GF(8)\}$ will now be constructed using a polynomial generator of the form $1+x+x^3$. Such an operation permits writing binary vectors of length 3 as powers of a primitive element "a". It should be recalled that modulo 2 arithmetic governs the addition and multiplication operations over the field.

Thus, the vector $1\ 1\ 0 = 1*a^0 + 1*a^1 + 0*a^2 = 1+a^1$

More particularly, given a primitive polynomial of $p(x)=1+x+x^3=0$, thus, in modulo 2 arithmetic, $x^3 = 1+x$.

Let "a" be a primitive element in GF(8) for three bit vectors. Polynomials as a function of a $a^0$, $a^1$, and $a^2$ are set out in Table 1 below:

TABLE 1

|  | $a^0$ | $a^1$ | $a^2$ |
|---|---|---|---|
| $a^0$ | 1 | 0 | 0 |
| $a^1$ | 0 | 1 | 0 |
| $a^2$ | 0 | 0 | 1 |
| $a^3$ | 1 | 1 | 0 |
| $a^4$ | 0 | 1 | 1 |
| $a^5$ | 1 | 1 | 1 |
| $a^6$ | 1 | 0 | 1 |
| $a^7$ | 1 | 0 | 0 |

It should be noted from Table 1, that the 0-element, or 0 0 0, cannot be represented as a power of a. Also, the vector for $a^7$ is 1 0 0.

Redundancy Aspects of B-Adjacent Codes and Polynomials

In the ensuing description, each data string is assumed to comprise seven data bytes (3 bits/byte) + two redundancy bytes, respectively $b(0), b(1), \ldots, b(6)$, and, $R(0), R(1)$. The form of the code is such that the data bytes remain in their given order and the two redundancy bytes are computed over the string and then appended thereto. Error detection is determined independently along the byte access path to each DASD. The means may include an ECC byte separately computed and checked along each path to a counterpart DASD and appending each recorded byte. Thus, the independent code means would indicate that $b(i)$ and $b(j)$ were in error but would not have information to correct the error or erasure.

It should be appreciated that the polynomial field could be defined for GF(256) or GF($2^8$) or larger. If so defined, then each data string could be partitioned into larger sized "blocks". In that circumstance, the ratio of the ECC byte appending each "block" to the block length would be less. Hence, greater storage efficiency.

Each code is defined in part by its "parity check matrix". This matrix determines the redundancy and syndrome relations for encoding and decoding. For the B-Adjacent code used in this invention, its parity check matrix may be expressed as:

$$H = \begin{matrix} 1 & 1 & 1 & 1 & 1 & 1 & 1 & 1 & 0 \\ a^6 & a^5 & a^4 & a^3 & a^2 & a^1 & a^0 & 0 & 1 \end{matrix}$$

For any given data string $b(0), b(1) \ldots b(6)$, the redundancy bytes are determined respectively by $$R(0) = b(0) + b(1) + \ldots + b(6) \bmod 2 \quad (1)$$

$$R(1) = a^6 * b(0) + a^5 * b(1) + a^4 * b(2) + a^3 * b(3) + a^2 b(4) + a^1 * b(5) + a^0 * b(6) \bmod 2 \quad (2)$$

Each power term $a^j$ has a vector value obtained from the table above. Thus, the polynomial term "$a^5*b(1)$" would be calculated as the vector product of $(1\ 1\ 1) * b(1)$. This product results in a 3 bit vector. $R(1)$ is a three bit vector determined by exclusive ORing of the resulting 3 bit vector product. More generally, each $a^j$ coefficient may take the form of a matrix. In the subsequent example, each coefficient is expressed as a $3 \times 3$ prestored matrix.

After, $R(0)$ and $R(1)$ are ascertained, they are appended to the N byte data string to form an $N+2$ byte string which are segmented and then recorded across $N+2$ DASDs constituting the addressable domain.

Redundancy Aspects of Correction Using B-Adjacent Codes

Each received segmented string has the form $$b'(0), b'(1), \ldots, b'(6), R'(0), R'(1)$$

B-Adjacent Codes posits a pair of syndromes $S(0)$ and $S(1)$ that in this case, according to the parity check matrix H above are given by:

$$S(0) = b'(0) + b'(1) + \ldots + b'(6) + R'(0) \bmod 2 \quad (3)$$

$$S(1) = a^6 * b'(0) + a^5 * b'(1) + \ldots + a^0 * b'(6) + R'(1) \bmod 2 \quad (4)$$

Assume that blocks $b(i)$ and $b(j)$ are not available. Also, assume that $b'(k) = b(k)$ unless it is in error. This means that $S(0) = 0$ and $S(1) = 0$ in the absence of at least one byte in error.

It should be mentioned that the syndromes are ascertained each time a data string is read. They are therefore available for all recovery purposes.

Thus if bytes $b(i)$ and $b(j)$ are unavailable, $$S(0) = b(i) + b(j) \bmod 2$$

$$S(1) = a^{(6-i)} * b(i) + a^{(6-j)} * b(j) \bmod 2$$

The equations above are two Boolean linear equations in two unknowns.

Solving for $b(i)$ and $b(j)$ as a function of the detected syndromes $S(0)$ and $S(1)$:

$$b(i) = [S(1) * a^{(j+1)} + S(0)] / [a^{(j-i)} + 1] \bmod 2 \quad (5)$$

$$b(j) = S(0) + b(i) \bmod 2 \quad (6)$$

Alternative Failures

If any two of the blocks/DASDs $b(0), \ldots b(6)$ is erased, then recovery made be made by directly computing $b(i)$ and $b(j)$ according to equations (5) and (6). In the case where blocks $R(0)$ and $R(1)$ are erased, then correction may be made by recomputation according to equations (1) and (2) at a time subsequent. However, if either blocks $b(i)$ and $R(0)$ or $b(i)$ and $R(1)$ are erased then recovery proceeds along a modified route. In the case of erasure of $b(i)$ and $R(0)$, then the following occurs:

$$S(1) = a^{(6-i)} * b(i) \bmod 2$$

The above constitutes one boolean linear equation with one unknown. Solving it, we obtain ps $$b(i) = a^{(i+1)} * S(1).$$

$R(0)$ can be recomputed using equation (1) at a time subsequent.

In the case of $b(i)$ and $R(1)$ erasure, we have:

$$S(0) = b(i)$$

This allows for immediate computation of $b(i)$. $R(1)$ can be recomputed using equation (2) at a time subsequent.

Representing the Elements in a Finite Field by $3 \times 3$ Matrices

In a binary finite field, 1 represents multiplicative identity and 0 connotes additive identity. Also, the primitive polynomial is $p(x) = 1 + x + x^3 = 0$. Thus, it is stipulated $$1 := \begin{matrix} 1\ 0\ 0 \\ 0\ 1\ 0 \\ 0\ 0\ 1 \end{matrix} \quad 0 := \begin{matrix} 0\ 0\ 0 \\ 0\ 0\ 0 \\ 0\ 0\ 0 \end{matrix} \quad a^1 = a := \begin{matrix} 0\ 1\ 0 \\ 0\ 0\ 1 \\ 1\ 1\ 0 \end{matrix} \begin{matrix} \text{companion} \\ \text{matrix} \\ \longleftarrow\!\!-\!\!- \end{matrix}$$

Computing each of the powers $a^2$ through $a^7$ as follows:

$$a^2 = a*a = \begin{matrix} 0\ 1\ 0 \\ 0\ 0\ 1 \\ 1\ 1\ 0 \end{matrix} * \begin{matrix} 0\ 1\ 0 \\ 0\ 0\ 1 \\ 1\ 1\ 0 \end{matrix} = \begin{matrix} 0\ 0\ 1 \\ 1\ 1\ 0 \\ 0\ 1\ 1 \end{matrix}$$

$$a^3 = a^2*a = \begin{matrix} 0\ 0\ 1 \\ 1\ 1\ 0 \\ 0\ 1\ 1 \end{matrix} * \begin{matrix} 0\ 1\ 0 \\ 0\ 0\ 1 \\ 1\ 1\ 0 \end{matrix} = \begin{matrix} 1\ 1\ 0 \\ 0\ 1\ 1 \\ 1\ 1\ 1 \end{matrix}$$

$$a^4 = a^3*a = \begin{matrix} 1\ 1\ 0 \\ 0\ 1\ 1 \\ 1\ 1\ 1 \end{matrix} * \begin{matrix} 0\ 1\ 0 \\ 0\ 0\ 1 \\ 1\ 1\ 0 \end{matrix} = \begin{matrix} 0\ 1\ 1 \\ 1\ 1\ 1 \\ 1\ 0\ 1 \end{matrix}$$

$$a^5 = a^4*a = \begin{matrix} 0\ 1\ 1 \\ 1\ 1\ 1 \\ 1\ 0\ 1 \end{matrix} * \begin{matrix} 0\ 1\ 0 \\ 0\ 0\ 1 \\ 1\ 1\ 0 \end{matrix} = \begin{matrix} 1\ 1\ 1 \\ 1\ 0\ 1 \\ 1\ 0\ 0 \end{matrix}$$

$$a^6 = a^5*a = \begin{matrix} 1\ 1\ 1 \\ 1\ 0\ 1 \\ 1\ 0\ 0 \end{matrix} * \begin{matrix} 0\ 1\ 0 \\ 0\ 0\ 1 \\ 1\ 1\ 0 \end{matrix} = \begin{matrix} 1\ 0\ 1 \\ 1\ 0\ 0 \\ 0\ 1\ 0 \end{matrix}$$

$$a^7 = a^6*a = \begin{matrix} 1\ 0\ 1 \\ 1\ 0\ 0 \\ 0\ 1\ 0 \end{matrix} * \begin{matrix} 0\ 1\ 0 \\ 0\ 0\ 1 \\ 1\ 1\ 0 \end{matrix} = \begin{matrix} 1\ 0\ 0 \\ 0\ 1\ 0 \\ 0\ 0\ 1 \end{matrix} = 1 \begin{matrix} \longleftarrow\!\!\text{identity} \\ \text{matrix} \end{matrix}$$

The matrices $a^i$ are then prestored. Also prestored are the matrices $1/[a^{(j-i)}+1]$. In the illustrative embodiment, the indices, i,j lie in the integer range $0 < i < j < 6$, so $j-i$ lies in the range $[1,6]$.

For $j-i = 1$ $$[a^1 + 1] = \begin{matrix} 0\ 1\ 0 \\ 0\ 0\ 1 \\ 1\ 1\ 0 \end{matrix} + \begin{matrix} 1\ 0\ 0 \\ 0\ 1\ 0 \\ 0\ 0\ 1 \end{matrix} = \begin{matrix} 1\ 1\ 0 \\ 0\ 1\ 1 \\ 1\ 1\ 1 \end{matrix} = a^3$$

-continued $$1/[a^1 + 1] = 1/a^3 = a^7/a^3 = a^4 = \begin{matrix} 0 & 1 & 1 \\ 1 & 1 & 1 \\ 1 & 0 & 1 \end{matrix}$$

For $j - i = 2$ $$[a^2 + 1] = \begin{matrix} 0 & 0 & 1 \\ 1 & 1 & 0 \\ 0 & 1 & 1 \end{matrix} + \begin{matrix} 1 & 0 & 0 \\ 0 & 1 & 0 \\ 0 & 0 & 1 \end{matrix} = \begin{matrix} 1 & 0 & 1 \\ 1 & 0 & 0 \\ 0 & 1 & 0 \end{matrix} = a^6$$

$$1/[a^2 + 1] = 1/a^6 = a^7/a^6 = a^1 = \begin{matrix} 0 & 1 & 0 \\ 0 & 0 & 1 \\ 1 & 1 & 0 \end{matrix}$$

For $j - i = 3$ $$[a^3 + 1] = \begin{matrix} 1 & 1 & 0 \\ 0 & 1 & 1 \\ 1 & 1 & 1 \end{matrix} + \begin{matrix} 1 & 0 & 0 \\ 0 & 1 & 0 \\ 0 & 0 & 1 \end{matrix} = \begin{matrix} 0 & 1 & 0 \\ 0 & 0 & 1 \\ 1 & 1 & 0 \end{matrix} = a^1$$

$$1/[a^3 + 1] = 1/a^1 = a^7/a^1 = a^6 = \begin{matrix} 1 & 0 & 1 \\ 1 & 0 & 0 \\ 1 & 1 & 0 \end{matrix}$$

For $j - i = 4$ $$[a^4 + 1] = \begin{matrix} 0 & 1 & 1 \\ 1 & 1 & 1 \\ 1 & 0 & 1 \end{matrix} + \begin{matrix} 1 & 0 & 0 \\ 0 & 1 & 0 \\ 0 & 0 & 1 \end{matrix} = \begin{matrix} 1 & 1 & 1 \\ 1 & 0 & 1 \\ 1 & 0 & 0 \end{matrix} = a^5$$

$$1/[a^4 + 1] = 1/a^5 = a^7/a^5 = a^2 = \begin{matrix} 0 & 0 & 1 \\ 1 & 1 & 0 \\ 0 & 1 & 1 \end{matrix}$$

For $j - i = 5$ $$[a^5 + 1] = \begin{matrix} 1 & 1 & 1 \\ 1 & 0 & 1 \\ 1 & 0 & 0 \end{matrix} + \begin{matrix} 1 & 0 & 0 \\ 0 & 1 & 0 \\ 0 & 0 & 1 \end{matrix} = \begin{matrix} 0 & 1 & 1 \\ 1 & 1 & 1 \\ 1 & 0 & 1 \end{matrix} = a^4$$

$$1/[a^5 + 1] = 1/a^4 = a^7/a^4 = a^3 = \begin{matrix} 1 & 1 & 0 \\ 0 & 1 & 1 \\ 1 & 1 & 1 \end{matrix}$$

For $j - i = 6$ $$[a^6 + 1] = \begin{matrix} 1 & 0 & 1 \\ 1 & 0 & 0 \\ 0 & 1 & 0 \end{matrix} + \begin{matrix} 1 & 0 & 0 \\ 0 & 1 & 0 \\ 0 & 0 & 1 \end{matrix} = \begin{matrix} 0 & 0 & 1 \\ 1 & 1 & 0 \\ 0 & 1 & 1 \end{matrix} = a^2$$

$$1/[a6 + 1] = 1/a^2 = a^7/a^2 = a^5 = \begin{matrix} 1 & 1 & 1 \\ 1 & 0 & 1 \\ 1 & 0 & 0 \end{matrix}$$

Pipeline Processing and Prestored Matrices

Figure 2:
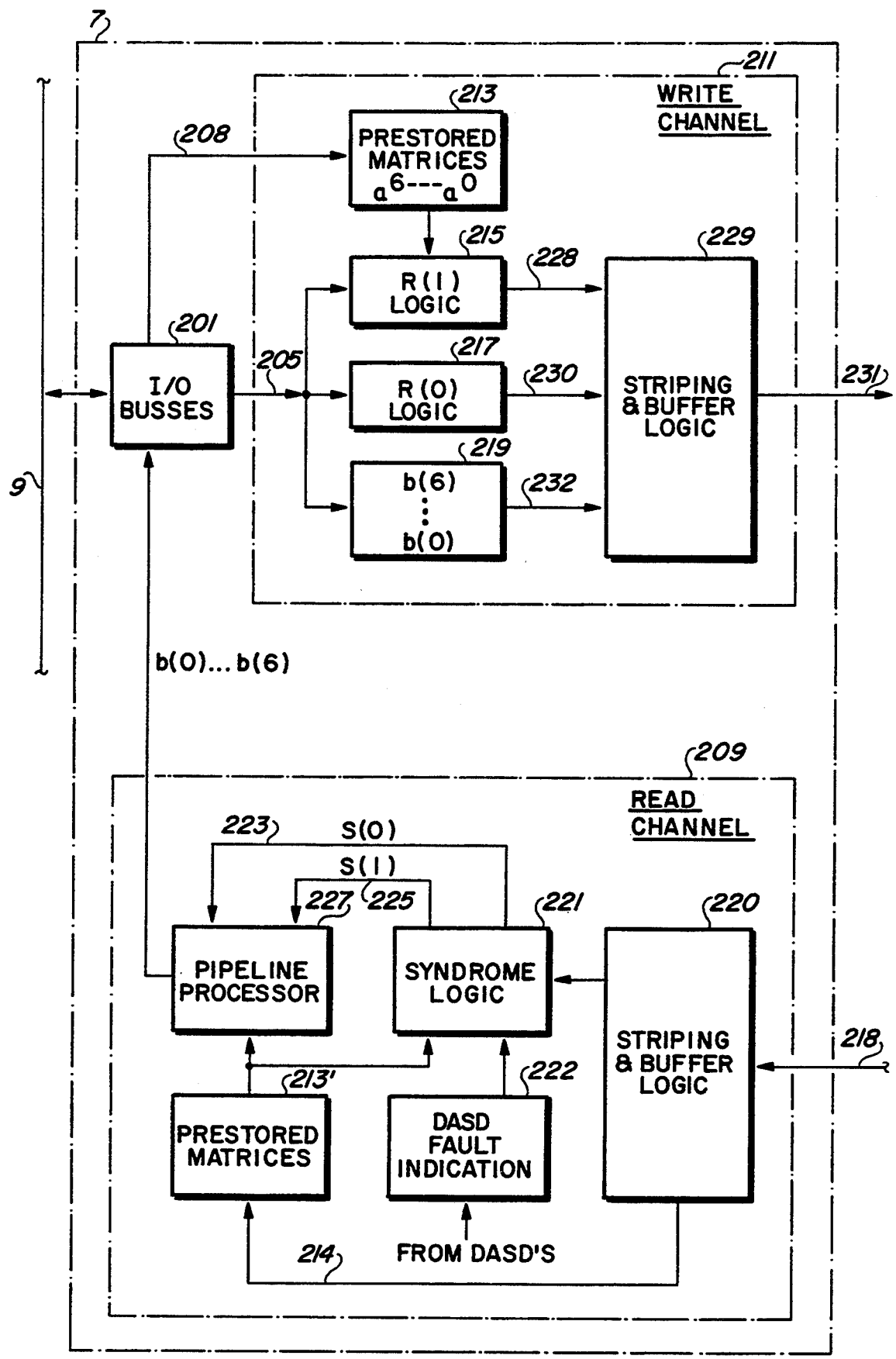
FIG. 2 depicts the pipeline decoding according to the invention.

Referring now to FIG. 2, there is depicted logical circuitry used in the parity, striping and buffer logic 7 set out in FIG. 1. Logic 7 processes the data addressed by read and write requests from a CPU over a counterpart read channel 209 or write channel 211. In the write channel direction, each data string $b(0), \ldots, b(6)$, after being temporarily stored in I/O buffer 201, is applied in parallel to the redundancy determining logic circuits 215 and 217 over path 205. Also, indications of non-zero bytes in the data string are applied to matrix store 213. These indications effectively cause the matrices to be available for any vector multiplication.

Logic circuits 215 and 217 compute the redundancy bytes R(1) and R(0) according to Boolean equations (1) and (2) above. The detailed combinatorial circuitry uses logic gates of the type well known to the skilled artisan and conventionally described in Langdon, "Computer Design", copyright 1982 by Computeach Press, San Jose Calif., LC 81-71785, at pages 463-505, and sequential logic, at pages 506-557. This combinatorial logic is based on prestored circuits representing the powers of the matrix as described above.

The redundancy bytes R(0) and R(1) are appended to the data bytes $b(0), \ldots, b(6)$. The latter reside in register 219. The contents of logic circuits 215 and 217 and register 219 are then gated out at the same time over paths 228, 230, and 232 to striping and buffer logic 229. Striping and buffer logic 229 applies the bytes to path 231. This comprises counterpart write paths 11, 13, 15, 17, and 18 to each of the array DASDs per FIG. 1. Each of the paths 11-18 may consist of an independent write and read conductors. Also, the appending of ECC is an independent function of the DASD control logic and is not considered to be part of this invention.

Responsive to an array read command, the data and redundancy bytes forming the addressed string are streamed from the counterpart DASDs over path 218 to striping and buffer logic 220 of read channel 209. Logic elements 220 and 229 may preferably be implemented as a single timeshared unit between said read and write channels. The occurrence of any DASD fault indication is provided by the DASDs to unit 222. Thus, the identity of the bytes of the data string in error is known to the syndrome logic 221.

The purpose of syndrome logic 221 is to provide up to two non-zero signals S(0) and S(1) coincident with the occurrence of DASD failure according to Boolean equations (3) and (4) above. Since the identity of the bytes in error b(i) and/or b(j) is known, a default value of 000 is used in the S(0) and S(1) syndrome determinations. As can be appreciated, equations (3) and (4) involve in the case of S(0) simple XORing of the indicated bytes. However, while S(1) involves matrix multiplication and XOR operations, this is well within the art as a brief exercise in combinatorial logic.

As was the case with processing the data string through the write channel, logic 220 for the read channel provides non-zero byte indication to the matrix store 213'. Accordingly, the matrices are available for matrix multiplication as needed by syndrome logic 221 and pipeline processor 227.

Logic 227 is designed to implement pipeline processing of the relations expressed in Boolean equations (5) and (6) by way of overlapped partial computations of various components. Given $$b(i) = [S(1)*a^{(j+1)} + S(0)]/[a^{(j-1)} + 1] \bmod 2 \quad (5)$$

$$b(j) = S(0) + b(i) \bmod 2 \quad (6)$$

The pipeline would compute the following order of components:

I. $A^{(j+1)}*S(1)$
II. $a^{(j+1)}*S(1) + S(0)$
III. $(1/[a^{(j-i)} + 1])*[a*^{(j+1)}*S(1) + S(0)] = b(i)$
IV. $b(j) = S(0) + b(i)$

The combinatorial logic circuits for implementing logic 227 and the performance of the indicated table look up operations is within the art. Suffice to state that the availability of the prestored matrices $a^6 \ldots a^1$ dispenses with both deriving the polynomial power of the code primitive "a" but eliminates any need for computing a matrix inverse. Note that the inverse term, $1/[a^{(j-i)} + 1]$ is equivalent to a power of "a" in each case.

As mentioned above, in the B-Adjacent code, each of the powers of the primitive term "a" for $GF(2^3)$ can be represented by a designated 3×3 bit matrix. Also, each of these matrices can be prestored. Further, the logical circuitry for performing the the indicated vector (mXr*rXn=mXn) multiplications can be highly simplified.

Data Recovery Using Pipeline Processing By Way of Example

Referring again to FIGS. 1 and 2, assume that the DASD array includes at least one domain of seven data+2 redundant DASDs. Further assume, that each data string comprises seven data bytes $b(0) \ldots b(6)$ and bytes $R(0)$ and $R(1)$ as follows:

As originally transferred to the array controller logic 7:

| b(0) | b(1) | b(2) | b(3) | b(4) | b(5) | b(6) |
|------|------|------|------|------|------|------|
| 101  | 011  | 001  | 000  | 010  | 111  | 010  |

The controller determines and appends redundant and R(1) which together with the data are written to counterpart DASDs:

$R(0) = 101 + 011 + 001 + 000 + 101 + 111 + 010 = 111 \bmod 2$ $R(1) = a^6*b(0) + a^5*b(1) + \ldots + a^0*b(6)$ $$
\begin{array}{cccccc}
a^6 & b(0) & a^5 & b(1) & a^4 & b(2) \\
1\,0\,1 & 1 & 1\,1\,1 & 0 & 0\,1\,1 & 0 \\
= 1\,0\,1 & *\,0\, + & 1\,0\,1 & *\,1\, + & 1\,1\,1 & *\,0\, + \\
0\,1\,0 & 1 & 1\,0\,0 & 1 & 1\,0\,1 & 1 \\
\end{array}
$$

$$
\begin{array}{cccccc}
a^3 & b(3) & a^2 & b(4) & a^1 & b(5) \\
1\,1\,0 & 0 & 0\,0\,1 & 1 & 0\,1\,0 & 1 \\
0\,1\,1 & *\,0\, + & 1\,1\,0 & *\,0\, + & 0\,0\,1 & *\,1\, + \\
1\,1\,1 & 0 & 0\,1\,1 & 1 & 1\,1\,0 & 1 \\
\end{array}
$$

$$
\begin{array}{cc}
a^0 & b(6) \\
1\,0\,0 & 0 \\
0\,1\,0 & *\,1 \\
0\,0\,1 & 0 \\
\end{array}
$$

$$
\begin{array}{c}
\;\;\;0\;\;\;\;\;0\;\;\;\;\;1\;\;\;\;\;0\;\;\;\;\;1\;\;\;\;\;1\;\;\;\;\;0 \\
= 1\, +\, 1\, +\, 1\, +\, 0\, +\, 1\, +\, 1\, +\, 1 \\
\;\;\;0\;\;\;\;\;0\;\;\;\;\;1\;\;\;\;\;0\;\;\;\;\;1\;\;\;\;\;0\;\;\;\;\;0 \\
\end{array}
$$

$$
= \begin{array}{c} 1 \\ 0 \\ 0 \end{array} = (100) \bmod 2
$$

Suppose the same string subsequently retrieved from the DASD array
into controller 7 appears as follows:

| b'(0) | b'(1) | b'(2) | b'(3) | b'(4) | b'(5) | b'(6) |
|-------|-------|-------|-------|-------|-------|-------|
| 101   | xxx   | 001   | 000   | xxx   | 111   | 010   |

It should be noted that for syndrome calculations S(0), S(1) the value of bytes b'(1) and b'(4) is presumed to be 000. This derives from the fact that the system has independent knowledge that the DASDs counterpart to b(1) and b(4) are unavailable as per prior discussion of ECC threshold detection.

$S(0) = b'(0) + b'(1) + \ldots + b'(6) + R'(0) \bmod 2$ $$
\begin{array}{cccccccc}
b(0) & b'(1) & b(2) & b(3) & b'(4) & b(5) & b(6) & R(0) \\
= 101 & +\,000 & +\,001 & +\,000 & +\,000 & +\,111 & +\,010 & +\,111 \\
\end{array}
$$

$= (110) \bmod 2$ $S(1) = a^6*b'(0) + a^5*b'(1) + \ldots + a^0*b'(6) + R'(1) \bmod 2$ $$
\begin{array}{cccccc}
a^6 & b(0) & a^5 & b'(1) & a^4 & b(2) \\
1\,0\,1 & 1 & 1\,1\,1 & 0 & 0\,1\,1 & 0 \\
= 1\,0\,1 & *\,0\, + & 1\,0\,1 & *\,0\, + & 1\,1\,1 & *\,0\, + \\
0\,1\,0 & 1 & 1\,0\,0 & 0 & 1\,0\,1 & 1 \\
\end{array}
$$

$$
\begin{array}{cccccc}
a^3 & b(3) & a^2 & b'(4) & a^1 & b(5) \\
1\,1\,0 & 0 & 0\,0\,1 & 0 & 0\,1\,0 & 1 \\
0\,1\,1 & *\,0\, + & 1\,1\,0 & *\,0\, + & 0\,0\,1 & *\,1\, + \\
1\,1\,1 & 0 & 0\,1\,1 & 0 & 1\,1\,0 & 1 \\
\end{array}
$$

$$
\begin{array}{ccc}
a^0 & b(6) & R(1) \\
1\,0\,0 & 0 & 1 \\
0\,1\,0 & *\,1 & +\,0 \\
0\,0\,1 & 0 & 0 \\
\end{array}
$$

$$
\begin{array}{c}
\;\;\;0\;\;\;\;\;0\;\;\;\;\;1\;\;\;\;\;0\;\;\;\;\;0\;\;\;\;\;1\;\;\;\;\;0\;\;\;\;\;1 \\
= 1\, +\, 0\, +\, 1\, +\, 0\, +\, 0\, +\, 1\, +\, 1\, +\, 0 \\
\;\;\;0\;\;\;\;\;0\;\;\;\;\;1\;\;\;\;\;0\;\;\;\;\;0\;\;\;\;\;0\;\;\;\;\;0\;\;\;\;\;0 \\
\end{array}
$$

$$
= \begin{array}{c} 1 \\ 0 \\ 1 \end{array} = (101) \bmod 2
$$

The pipeline operations start with the outputs of the syndrome logic S(0) and S(1) and combine these with the appropriate prestored matrices. In this example, bytes b'(1) and b'(4) (and the counterpart DASDs) can be recovered by:

form $a^{(j+1)}*S(1)$ where i=1, j=4, and j−i=3    I.

$a^{(j+1)} = a^{(4+1)} = a^5$ $$
a^5*S(1) = \begin{array}{ccc} 1\,1\,1 & 1 & 0 \\ 1\,0\,1 & *\,0 & =\,0 \\ 1\,0\,0 & 1 & 1 \end{array} = (001) \bmod 2
$$

$$
\begin{array}{c} 0 \\ 1 \\ \;\;\;\;\;\;0 \end{array}
$$    II.

form $a^5*S(1) + S(0) = 0 + \begin{array}{c}1\\1\end{array} = (111) \bmod 2$ form $[1/(a^3 + 1)][a^5*S(1) + S(0)] = a^6 (111) =$    III.

$$
= \begin{array}{ccc} 1\,0\,1 & 1 & 0 \\ 1\,0\,0 & *\,1 & =\,1 \\ 0\,1\,0 & 1 & 1 \end{array} = (011) \bmod 2 = b(1)
$$

IV.

form $b(4) = S(0) + b(1) = 110 + 011 = (101) \bmod 2$

Extensions

The block parity coding, writing, and array rebuilding principles of this invention may be extended to data storage on magnetic or optical multi-track tapes consisting of many tracks where information is stored in parallel. Each bit or byte in a track is synchronous with every bit or byte in the same location in different tracks.

Sometimes, loss of signal in one or more tracks makes the whole track unavailable to the user, so coding is employed in order to retrieve the information lost in the erased tracks. The logical processing of magnetic of optical multi-track tape storage proceeds on the same error detection and correction modality as that used with DASD arrays.

We claim:

1. A method for correcting portions of a data string stored on up to two unavailable DASDs in a synchronous array of N+2 failure independent DASDs, comprising the steps of:

(a) segmenting a data string into N blocks, B-Adjacent coding of first and second redundant blocks from the string, and writing N data and the two redundant blocks to N+2 counterpart DASDs, said B-adjacent code implicitly defining a parity check matrix;

(c) responsive to the identification of the unavailable DASDs, recursively forming and resolving a pair of syndromes as implicitly defined by the partly check matrix and obtained from the blocks of the same string on the remaining DASDs, said syndrome pair consisting of up to two independent Boolean equations in two unknowns, said recursive formation and resolution including overlap processing of the terms of the Boolean equations defining up to two blocks in error within a time period approximating the write update time for resolution of a single block in error.

2. An apparatus for coding and recovery of up to two blocks in each symbol string formed from N data blocks $b(0), b(N-1)$ and two redundant blocks $R(0)$ and $R(1)$, the blocks of said string being stored across a domain of N+2 synchronously accessible failure independent DASDs, comprising:

(a) means for storing matrix representations of the polynomial powers of a primitive element of a finite field code of the B-Adjacent type;

(b) an encoder responsive to each symbol string and including means for computing $R(0)$ as the modulo addition of $b(0), \ldots b(N-1)$ and for computing $R(1)$ as a polynomial operation over $b(0), \ldots, b(N-1)$; and means for accessing the matrix store for utilizing the representation of the polynomial power indexed upon were i lies in the integer interval $[0, N-1]$;

(c) means for identifying up to two failed DASDs in the domain;

(d) a decoder coupling the identifying means and including means for recursively computing a first $S(0)$ syndrome over the modulo addition of $b(0), \ldots, b(N-1), R(0)$ and a second syndrome $S(1)$ as a polynomial operation over $b(0), \ldots, b(N-1), R(1)$; and means for accessing the matrix store for utilizing the representation of the polynomial power indexed to the block $b(i)$ being operated upon where i lies in the integer interval $[0, N-1]$; and (e) means for recursively resolving up to two data blocks $b(i)$ and $b(j)$ in error as a function of $S(0)$ and $S(1)$, and for resolving $b(i)$ and $R(0)$ in error where $b(i)$ is a function of $S(1)$ and $R(0)$ is the modulo addition over $b(0), \ldots, b(N-1)$, and for resolving $b(i)$ and $R(1)$ where $b(i)$ is a function of $S(0)$ and $R(1)$ is the polynomial operation over $b(0), b(1), \ldots, b(N-1)$, said recursive resolution means including means for overlap processing of the terms of the Boolean equations defining the blocks in error within a time period approximating the write update time for resolution of a single block in error.

3. In an external storage system for CPU attachment, said system comprising a plurality of failure independent DASDs and means responsive to selective CPU commands for synchronously accessing data strings from at least one failure independent parity domain of N+2 of plurality of DASDs, said accessing means further comprising:

(a) means responsive to each data string for segmenting, B-adjacent coding, and writing N data blocks $b(0), b(1), \ldots, b(N-1)$ of the segmented data string and a first $R(0)$ and a second redundant $R(1)$ block to N+2 DASDs, said B-adjacent code implicitly defining a predetermined parity check matrix;

(b) means for identifying up to two concurrently unavailable ones of the N+2 domain DASDs;

(c) means responsive to the unavailability of up to two blocks in each string counterpart to up to two identified unavailable DASDs, said blocks being selected from the set including $b(i)$ and $b(j)$, for rebuilding said unavailable blocks by overlap processing of the terms of the Boolean equations defining the blocks in error within a time period approximating the write update time for resolution of a single block in error including:

(1) ascertaining a first $S(0)$ and a second $S(1)$ syndrome from the counterpart N-2 available blocks according to the parity check matrix;

(2) computing $b(i)$ and $b(j)$ as a function of $S(0)$ and $S(1)$; and (3) recoding the blocks of each of the data strings stored on the N available DASDs according to step (a) using blocks $b(i)$ and $b(j)$ as computed in step (c)(2).

4. The system according to claim 3, wherein said plurality of DASDs includes up to two otherwise reserved DASDs, and further wherein said rebuilding means includes means for writing each of the data strings onto N available DASDs of the domain and onto up to two of the otherwise reserved DASDs.

5. The system according to claim 3, wherein the set of blocks in error further comprises $b(i)$ and $R(0)$, $b(i)$ and $R(1)$, and $R(0)$ and $R(1)$.

6. In an external storage system for CPU attachment said system comprising a plurality of failure independent DASDs, and means responsive to selective CPU commands for synchronously accessing data strings from at least one failure independent parity domain of N+2 of said plurality of DASDs, an improvement wherein said accessing means further comprise:

(a) means responsive to each data string for segmenting, B-adjacent coding, and writing N data blocks $b(0), b(1), \ldots, b(N-1)$ of the segmented data string and a first $R(0)$ and a second redundant $R(1)$ block to N+2 DASDs, said B-adjacent code implicitly defining a predetermined parity check matrix;

b) means for identifying up to two concurrently unavailable ones of the N+2 domain DASDs;

(c) means responsive to the unavailability of up to two blocks in each string counterpart to up to two identified unavailable DASDs, said blocks being selected from the set consisting of $b(i)$ and $b(j)$, $b(i)$ and $R(0)$, $b(i)$ and $R(1)$, and $R(0)$ and $R(1)$, for rebuilding said unavailable blocks by overlap processing of the terms of the Boolean equations defining the blocks in error within a time period approximating the write update time for resolution of a single block in error including:
(1) ascertaining a first S(0) and a second S(1) syndrome from the counterpart N-2 available blocks according to the parity check matrix where either b(i) and b(j), b(i) and R(0), or b(i) and R(1) are in error;
(2) computing b(i) and b(j) as a function of S(0) and S(1), b(i) and R(0) as a function of S(1), and b(i) and R(1) as a function of S(0); and
(3) recoding and rewriting the blocks of each of the data strings stored on the parity domain onto N available DASDs and up to two others of the plurality of DASDs according to step (a) using blocks b(i) and b(j) as computed in step (c)(2).

7. In the system according to either claims 2, 3 or 5, indices i and j lie in the range $[0, i<j, N-1]$.

8. A method for encoding and rebuilding the data contents of up to two unavailable DASDs in an array of failure independent DASDs, comprising the steps of:
(a) B-adjacent coding and writing N data blocks $b(0), b(1), \ldots, b(N-1)$ of a segmented data string and a first R(0) and a second redundant R(1) block to N+2 counterpart available DASDs, said B-adjacent code implicitly defining a predetermined parity check matrix;
(b) identifying up to two unavailable DASDs in the DASD domain encoded and written to in step (a); and
(c) responsive to the unavailability of up to two blocks b(i) and b(j) in each string from each of up to two identified unavailable DASDs, recursively rebuilding b(i) and b(j) for each string by overlap processing of the terms of the Boolean equations defining the blocks in error within a time period approximating the write update time for resolution of a single block in error including:
(1) ascertaining a first S(0) and a second S(1) syndrome from the counterpart N−2 available blocks according to the parity check matrix;
(2) computing b(i) and b(j) as a function of S(0) and S(1); and
(3) recoding and rewriting the blocks of each of the data strings stored on the N available DASDs including up to two of the spares according to step (a) using blocks b(i) and b(j) as computed in step (b)(2).

whereby the effect of the redundancy is to balance the writing operations across the DASDs.

9. The method according to claim 8, wherein, said B-adjacent coding includes computing R(0) and R(1) according to the modulo 2 relations $$R(0) = b(0) + b(1) + \ldots b(N-1)$$

$$R(1) = a^{(N-1)} * b(0) + a^{(N-2)} * b(1) + \ldots + a^{(0)} b(N-1)$$

where "a" is a primitive element in a finite field expressed as a code generated polynomial and $a^N = 1$.

10. The method according to claim 8, wherein b(i) and b(j) computed as a function of the detected syndromes S(0) and S(1) according to the modulo 2 relations $$b(i) = [S(1) * a^{(j+1)} + S(0)] / [a^{(j-i)} + 1]$$

$$b(j) = S(0) + b(i).$$

11. The method according to claim 8, wherein said method further comprises the step of pipeline processing steps (a) through (c).

* * * * *

UNITED STATES PATENT AND TRADEMARK OFFICE
CERTIFICATE OF CORRECTION

PATENT NO. : 5,333,143
DATED : July 26, 1994
INVENTOR(S) : M. Blaum, N.K. Ouchi

It is certified that error appears in the above-indentified patent and that said Letters Patent is hereby corrected as shown below:

Column 10, line 49, delete "$[a^{(j-1)}+1]$" and add --$[a^{(j-1)}+1]$--

Column 10, line 57, delete the * after the second "[a".

Column 11, line 22, after "appends redundant" add --bytes R(0)--.

Column 12, line 49, delete "0  $1^0$" and add --0  1--.

Column 12, line 51, add a -- 0--.

Column 13, line 46, after "polynomial power indexed" add --to the block b(I) being operated--

Column 13, line 47, delete "were" and add --where--

Signed and Sealed this

Eleventh Day of July, 1995

Attest:

BRUCE LEHMAN

*Attesting Officer*              *Commissioner of Patents and Trademarks*